US010240619B2

United States Patent
Oi

(10) Patent No.: US 10,240,619 B2
(45) Date of Patent: Mar. 26, 2019

(54) BICYCLE OPERATING DEVICE

(71) Applicant: SHIMANO INC., Sakai (JP)

(72) Inventor: Takeshi Oi, Sakai (JP)

(73) Assignee: SHIMANO INC., Sakai (JP)

( * ) Notice: Subject to any disclaimer, the term of this patent is extended or adjusted under 35 U.S.C. 154(b) by 204 days.

(21) Appl. No.: 15/016,208

(22) Filed: Feb. 4, 2016

(65) Prior Publication Data
US 2017/0227022 A1    Aug. 10, 2017

(51) Int. Cl.
*B62L 3/02* (2006.01)
*F15B 7/08* (2006.01)
*B62K 23/06* (2006.01)

(52) U.S. Cl.
CPC ............... *F15B 7/08* (2013.01); *B62K 23/06* (2013.01); *B62L 3/023* (2013.01)

(58) Field of Classification Search
CPC ................................ B60T 11/02; B60T 7/102
USPC ..................................................... 60/585, 157
See application file for complete search history.

(56) References Cited

U.S. PATENT DOCUMENTS

| 8,393,449 B2 | 3/2013 | Dunlap | |
|---|---|---|---|
| 8,943,924 B2 * | 2/2015 | Thomas | G05G 1/04 188/26 |
| 2012/0152673 A1 * | 6/2012 | Wang | B60T 7/102 188/344 |
| 2013/0008751 A1 * | 1/2013 | Dunlap, III | B62L 3/023 188/347 |
| 2015/0266540 A1 | 9/2015 | Snead | |

FOREIGN PATENT DOCUMENTS

| CN | 104943804 | 9/2015 |
|---|---|---|
| GB | 1536353 | 12/1978 |

* cited by examiner

*Primary Examiner* — Thomas E Lazo
*Assistant Examiner* — Daniel S Collins
(74) *Attorney, Agent, or Firm* — Mori & Ward, LLP

(57) ABSTRACT

A bicycle operating device comprises a base, an operating member, a hydraulic cylinder, a piston, a connecting link, and a guiding structure. The operating member is pivotally coupled to the base. The hydraulic cylinder is mounted to the base. The piston is movably provided in the hydraulic cylinder. The connecting link is pivotally coupled to each of the operating member and the piston to move the piston relative to the hydraulic cylinder in response to a pivotal movement of the operating member relative to the base. The guiding structure is coupled to the piston to guide the piston relative to the base.

21 Claims, 10 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base, an operating member, a hydraulic cylinder, a piston, a connecting link, and a guiding structure. The operating member is pivotally coupled to the base. The hydraulic cylinder is mounted to the base. The piston is movably provided in the hydraulic cylinder. The connecting link is pivotally coupled to each of the operating member and the piston to move the piston relative to the hydraulic cylinder in response to a pivotal movement of the operating member relative to the base. The guiding structure is coupled to the piston to guide the piston relative to the base.

With the bicycle operating device according to the first aspect, it is possible to change an amount of movement of the piston relative to an amount of movement of the operating member by changing a shape, a position, and/or a size of the connecting link. Thus, it is possible to obtain a preferable movement ratio characteristic between the operating member and the piston.

In accordance with a second aspect of the present invention, the bicycle operating device according to the first aspect is configured so that the operating member is pivotally coupled to the base about a first pivot axis. The connecting link is pivotally coupled to the operating member about a second pivot axis spaced apart from the first pivot axis. The connecting link is pivotally coupled to the piston about a third pivot axis spaced apart from the first and second pivot axes.

With the bicycle operating device according to the second aspect, it is possible to smoothly transmit the pivotal movement of the operating member to the piston.

In accordance with a third aspect of the present invention, the bicycle operating device according to the second aspect is configured so that the first, second and third pivot axes are parallel to each other.

With the bicycle operating device according to the third aspect, it is possible to more smoothly transmit the pivotal movement of the operating member to the piston.

In accordance with a fourth aspect of the present invention, the bicycle operating device according to the second or third aspect is configured so that the piston is movable relative to the hydraulic cylinder in a movement direction between an initial position and an actuated position. The second pivot axis is disposed between the first and third pivot axes in a perpendicular direction which is perpendicular to the movement direction.

With the bicycle operating device according to the fourth aspect, it is possible to shorten a size of the connecting link, allowing the bicycle operating device to be more compact.

In accordance with a fifth aspect of the present invention, the bicycle operating device according to the fourth aspect is configured so that the hydraulic cylinder includes a cylinder bore in which the piston is at least partially provided. The piston and the cylinder bore define a hydraulic chamber between the piston and the cylinder bore. The third pivot axis is disposed between the second pivot axis and the hydraulic chamber in the movement direction, at least in an initial state where the piston is positioned at the initial position.

With the bicycle operating device according to the fifth aspect, it is possible to transmit a pushing force from the operating member to the piston via the connecting link.

In accordance with a sixth aspect of the present invention, the bicycle operating device according to the fifth aspect is configured so that the second pivot axis is disposed at a position which is equal to a position of the first pivot axis in the movement direction or which is located between the third pivot axis and the first pivot axis in the movement direction, at least in the initial state.

With the bicycle operating device according to the sixth aspect, it is possible to quickly change the hydraulic pressure around a starting point of the second pivot axis corresponding to the initial position of the piston.

In accordance with a seventh aspect of the present invention, the bicycle operating device according to any one of the fourth to sixth aspects is configured so that the hydraulic cylinder includes a cylinder bore in which the piston is at least partially provided. The piston and the cylinder bore define a hydraulic chamber between the piston and the cylinder bore. The second pivot axis is disposed between the third pivot axis and the hydraulic chamber in the movement direction, at least in an initial state where the piston is positioned at the initial position.

With the bicycle operating device according to the seventh aspect, it is possible to transmit a pulling force from the operating member to the piston via the connecting link.

In accordance with an eighth aspect of the present invention, the bicycle operating device according to the seventh aspect is configured so that the second pivot axis is disposed at a position which is equal to a position of the first pivot axis in the movement direction or which is located between the third pivot axis and the first pivot axis in the movement direction, at least in the initial state.

With the bicycle operating device according to the eighth aspect, it is possible to quickly change the hydraulic pressure around a starting point of the second pivot axis corresponding to the initial position of the piston.

In accordance with a ninth aspect of the present invention, the bicycle operating device according to any one of the second to eighth aspects is configured so that the guiding structure includes a guiding link. The guiding link is pivotally coupled to the piston about a fourth pivot axis. The guiding link is pivotally coupled to the base about a fifth pivot axis.

With the bicycle operating device according to the ninth aspect, it is possible to make a movement of the piston relative to the base member more stable because of the guiding link.

In accordance with a tenth aspect of the present invention, the bicycle operating device according to the ninth aspect is configured so that the fourth pivot axis coincides with the third pivot axis.

With the bicycle operating device according to the tenth aspect, it is possible to simplify a connecting part provided among the piston, the connecting link, and the guiding link.

In accordance with an eleventh aspect of the present invention, the bicycle operating device according to any one of the second to tenth aspects is configured so that the connecting link includes a first proximal end and a first distal end. The first proximal end is pivotally coupled to the operating member about the second pivot axis. The first distal end is pivotally coupled to the piston about the third pivot axis.

With the bicycle operating device according to the eleventh aspect, it is possible to simplify the structure of the connecting link.

In accordance with a twelfth aspect of the present invention, the bicycle operating device according to the eleventh aspect is configured so that the guiding structure includes a guiding link. The guiding link has a second proximal end and a second distal end. The second proximal end is pivotally coupled to the piston about a fourth pivot axis. The second distal end is pivotally coupled to the base about a fifth pivot axis.

With the bicycle operating device according to the twelfth aspect, it is possible to guide the piston with a simple structure.

In accordance with a thirteenth aspect of the present invention, the bicycle operating device according to any one of the first to twelfth aspects is configured so that the hydraulic cylinder includes a cylinder bore. The piston includes a piston body and a piston rod. The piston body is movably provided in the cylinder bore. The piston rod is pivotally coupled to the piston body to operatively couple the connecting link to the piston body.

With the bicycle operating device according to the thirteenth aspect, it is possible to simplify the structure of the piston body.

In accordance with a fourteenth aspect of the present invention, the bicycle operating device according to the thirteenth aspect is configured so that the operating member is pivotally coupled to the base about a first pivot axis. The connecting link is pivotally coupled to the operating member about a second pivot axis spaced apart from the first pivot axis. The connecting link is pivotally coupled to the piston rod about a third pivot axis spaced apart from the first and second pivot axes.

With the bicycle operating device according to the fourteenth aspect, it is possible to smoothly transmit the pivotal movement of the operating member to the piston with simplifying the structure of the connecting link.

In accordance with a fifteenth aspect of the present invention, the bicycle operating device according to the fourteenth aspect is configured so that the guiding structure includes a guiding link. The guiding link is pivotally coupled to the piston rod about a fourth pivot axis. The guiding link is pivotally coupled to the base about a fifth pivot axis.

With the bicycle operating device according to the fifteenth aspect, it is possible to make a movement of the piston relative to the base more stable because of the guiding link.

In accordance with a sixteenth aspect of the present invention, the bicycle operating device according to the fifteenth aspect is configured so that the fourth pivot axis coincides with the third pivot axis.

With the bicycle operating device according to the sixteenth aspect, it is possible to simplify a connecting part provided among the piston rod, the connecting link, and the guiding link.

In accordance with a seventeenth aspect of the present invention, the bicycle operating device according to any one of the second to sixteenth aspects is configured so that the guiding structure includes a guiding bore through which the piston extends. The piston and the cylinder bore define a hydraulic chamber between the piston and the cylinder bore. The guiding bore is provided on the base between the hydraulic chamber and a third pivot axis.

With the bicycle operating device according to the seventeenth aspect, it is possible to make a movement of the piston relative to the base more stable because of the guiding bore.

In accordance with an eighteenth aspect of the present invention, the bicycle operating device according to any one of the first to seventeenth aspects further comprises a hydraulic reservoir. The hydraulic cylinder includes a cylinder bore. The piston is movably provided in the cylinder bore. The hydraulic reservoir is connected to a hydraulic chamber defined by the piston and the hydraulic cylinder in the cylinder bore.

With the bicycle operating device according to the eighteenth aspect, the hydraulic reservoir can absorb change in volume of hydraulic fluid caused by change in a temperature of the hydraulic fluid.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
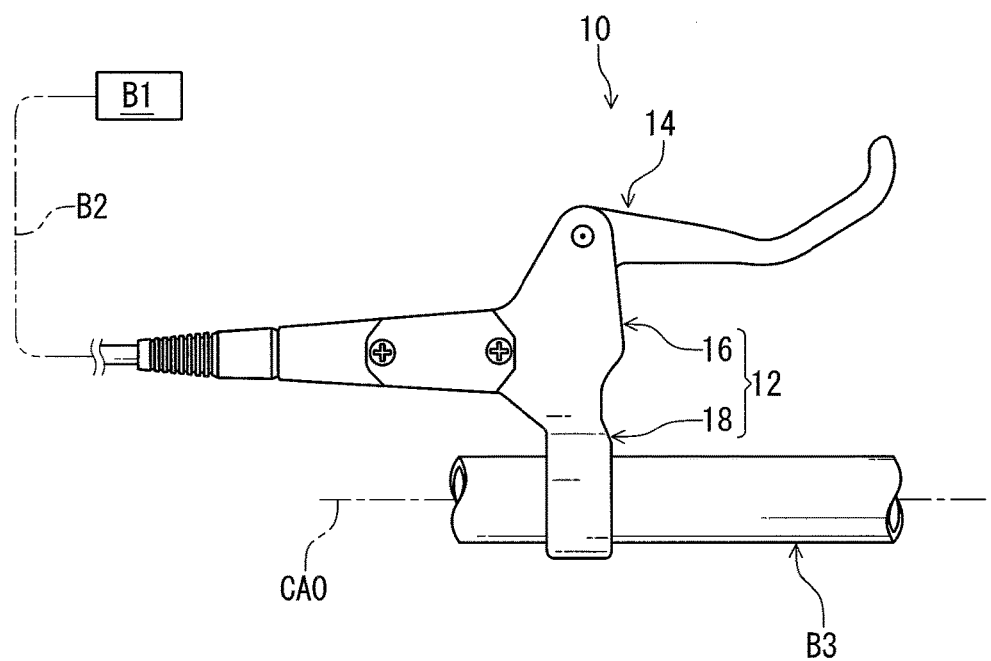
FIG. 1 is a plan view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is illustrated. The bicycle operating device 10 is connected to a bicycle component B1 via a hydraulic hose B2. Examples of the bicycle component B1 include a bicycle brake caliper. The bicycle operating device 10 comprises a base 12 and an operating member 14. The operating member 14 is pivotally coupled to the base 12. The base 12 is coupled to a bicycle tubular part B3 such as a handlebar in a mounting state where the bicycle operating device 10 is mounted to the bicycle tubular part B3. The bicycle tubular part B3 includes a center axis CA0. In this embodiment, the base 12 includes a base body 16 and a clamp structure 18. The operating member 14 is pivotally coupled to the base body 16. The clamp structure 18 couples the base body 16 to the bicycle tubular part B3.

While the base body 16 is integrally provided with the clamp structure 18 in this embodiment, the base body 16 can be a separate part from the clamp structure 18. In this embodiment, the bicycle operating device 10 is a right-side operating device operated by a rider's right hand. However, structures of the bicycle operating device 10 can be applied to a left-side operating device operated by a rider's left hand.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing the handlebar. Accordingly, these terms, as utilized to describe the bicycle operating device 10, should be interpreted relative to the bicycle equipped with the bicycle operating device 10 as used in an upright riding position on a horizontal surface.

Figure 2:
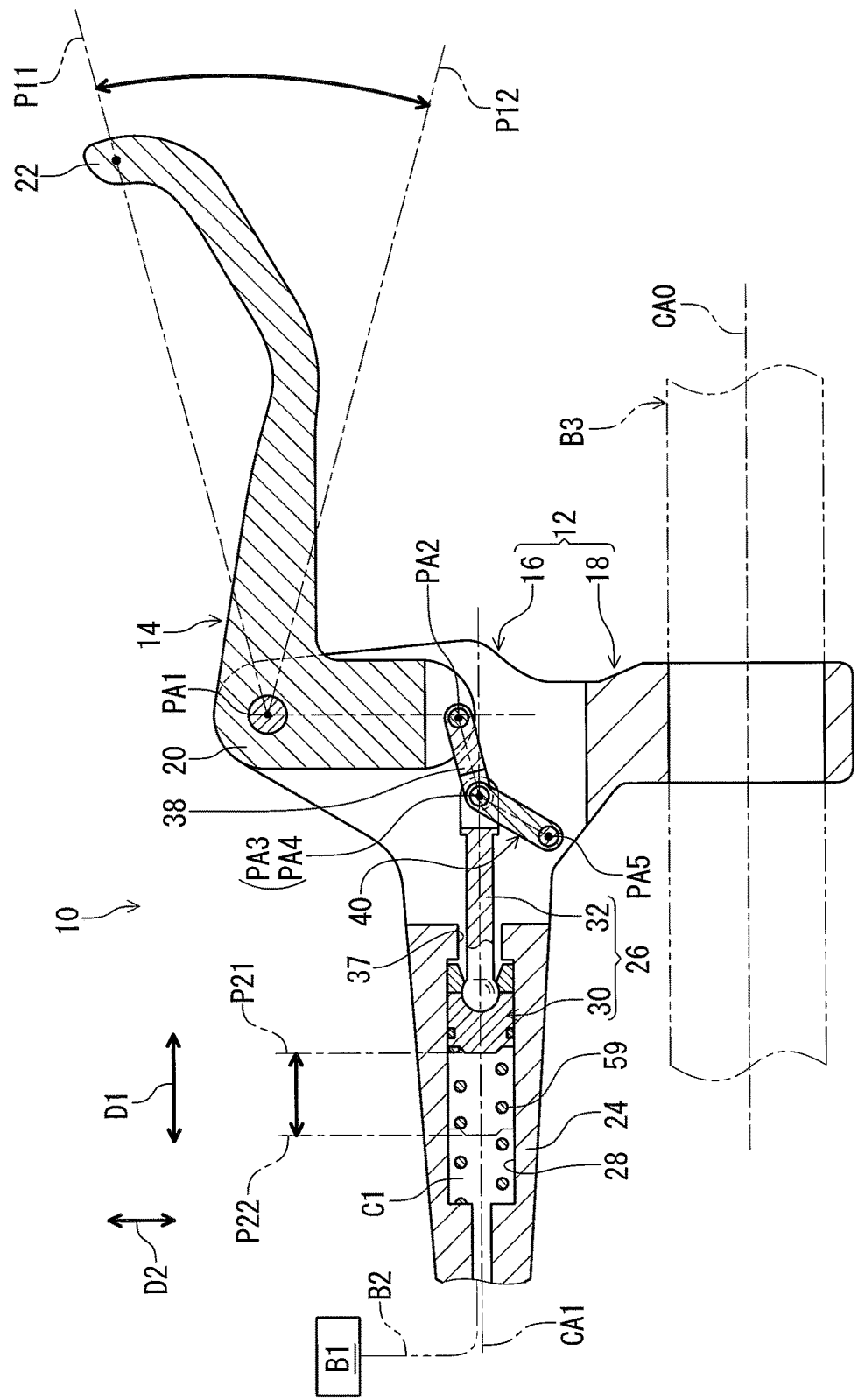
FIG. 2 is a cross-sectional view of the bicycle operating device illustrated in FIG. 1 (an initial position).

As seen in FIG. 2, the operating member 14 is pivotable relative to the base 12 between a rest position P11 and an operated position P12. The operating member 14 includes a first end part 20 and a second end part 22 opposite to the first end part 20. The operating member 14 extends between the first end part 20 and the second end part 22. The first end part 20 is pivotally coupled to the base 12. In this embodiment, the rest position P11 and the operated position P12 are defined based on the first end part 20 and the second end part 22.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of the bicycle component B1.

As seen in FIG. 2, the bicycle operating device 10 comprises a hydraulic cylinder 24 and a piston 26. The hydraulic cylinder 24 is mounted to the base 12. The piston 26 is movably provided in the hydraulic cylinder 24. The piston 26 is movable relative to the hydraulic cylinder 24 in a movement direction D1 between an initial position P21 and an actuated position P22. The initial position P21 of the piston 26 corresponds to the rest position P11 of the operating member 14. The actuated position P22 of the piston 26 corresponds to the operated position P12 of the operating member 14.

The hydraulic cylinder 24 includes a cylinder bore 28 in which the piston 26 is at least partially provided. The cylinder bore 28 defines a center axis CA1 extending in the movement direction D1. The center axis CA1 of the cylinder bore 28 extends along the center axis CA0 of the bicycle tubular part B3 in the mounting state where the bicycle operating device 10 is mounted to the bicycle tubular part B3. The piston 26 and the cylinder bore 28 define a hydraulic chamber C1 between the piston 26 and the cylinder bore 28. The hydraulic chamber C1 is connected to a slave chamber of the bicycle component B1 via the hydraulic hose B2.

Figure 3:
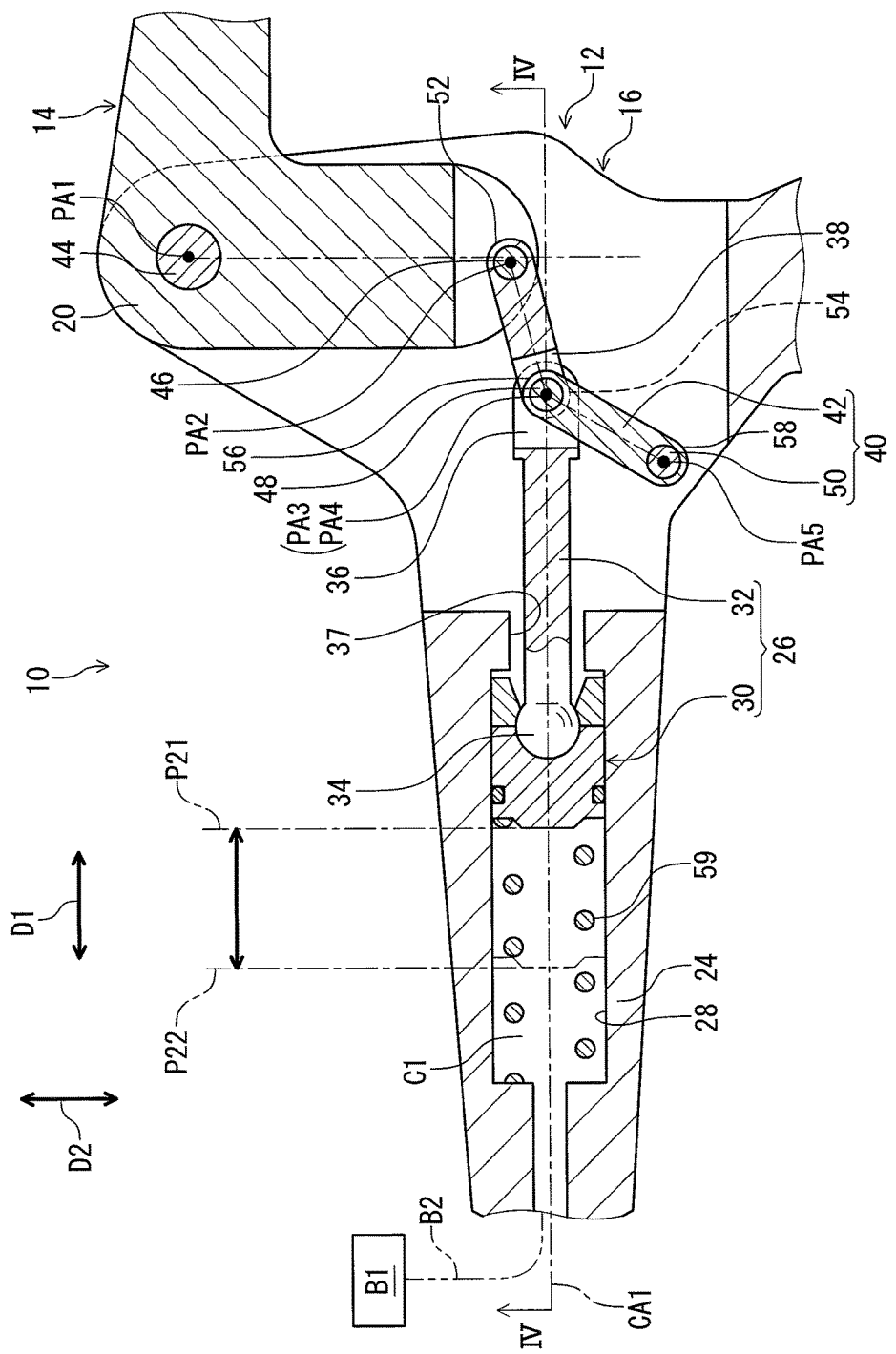
FIG. 3 is a partial enlarged cross-sectional view of the bicycle operating device illustrated in FIG. 1 (the initial position).

As seen in FIG. 3, the piston 26 includes a piston body 30 and a piston rod 32. The piston body 30 is movably provided in the cylinder bore 28. The piston rod 32 is pivotally coupled to the piston body 30. The piston rod 32 includes a first rod end 34 and a second rod end 36 opposite to the first rod end 34. The first rod end 34 is pivotally coupled to the piston 26. The hydraulic cylinder 24 includes a through-hole 37 connected to the cylinder bore 28. The piston rod 32 extends through the through-hole 37. The through-hole 37 has an inner diameter larger than an outer diameter of the piston rod 32 to avoid interference between the hydraulic cylinder 24 and the piston rod 32.

The bicycle operating device 10 comprises a connecting link 38. The connecting link 38 is pivotally coupled to each of the operating member 14 and the piston 26 to move the piston 26 relative to the hydraulic cylinder 24 in response to a pivotal movement of the operating member 14 relative to the base 12. The piston rod 32 is pivotally coupled to the piston body 30 to operatively couple the connecting link 38 to the piston body 30.

The bicycle operating device 10 comprises a guiding structure 40. The guiding structure 40 is coupled to the piston 26 to guide the piston 26 relative to the base 12. In this embodiment, the guiding structure 40 includes a guiding link 42. The guiding link 42 is coupled to the piston 26 to guide the piston 26 relative to the base 12.

The operating member 14 is pivotally coupled to the base 12 about a first pivot axis PA1. The connecting link 38 is pivotally coupled to the operating member 14 about a second pivot axis PA2 spaced apart from the first pivot axis PA1. The connecting link 38 is pivotally coupled to the piston 26 about a third pivot axis PA3 spaced apart from the first and second pivot axes PA1 and PA2. The guiding link 42 is pivotally coupled to the piston 26 about a fourth pivot axis PA4. The guiding link 42 is pivotally coupled to the base 12 about a fifth pivot axis PA5.

The bicycle operating device 10 comprises a first pivot pin 44, a second pivot pin 46, and a third pivot pin 48. The operating member 14 is pivotally coupled to the base 12 about the first pivot axis PA1 via the first pivot pin 44. The connecting link 38 is pivotally coupled to the operating member 14 about the second pivot axis PA2 via the second pivot pin 46. The connecting link 38 is pivotally coupled to the piston 26 about the third pivot axis PA3 via the third pivot pin 48. The guiding link 42 is pivotally coupled to the piston 26 about the fourth pivot axis PA4 via the third pivot pin 48. The guiding structure 40 includes a guide pivot pin 50. The guiding link 42 is pivotally coupled to the base 12 about the fifth pivot axis PA5 via the guide pivot pin 50.

The connecting link 38 is pivotally coupled to the piston rod 32 about the third pivot axis PA3 spaced apart from the first and second pivot axes PA1 and PA2. The connecting link 38 includes a first proximal end 52 and a first distal end 54. The first proximal end 52 is pivotally coupled to the operating member 14 about the second pivot axis PA2. The first distal end 54 is pivotally coupled to the piston 26 about the third pivot axis PA3.

The guiding link 42 is pivotally coupled to the piston rod 32 about the fourth pivot axis PA4. The guiding link 42 includes a second proximal end 56 and a second distal end 58. The second proximal end 56 is pivotally coupled to the piston 26 about the fourth pivot axis PA4. The second distal end 58 is pivotally coupled to the base 12 about the fifth pivot axis PA5.

While the first, second and third pivot axes PA1, PA2, and PA3 are parallel to each other in this embodiment, at least one of the first, second and third pivot axes PA1, PA2, and PA3 can be non-parallel to another. While the fourth pivot axis PA4 coincides with the third pivot axis PA3 in this embodiment, the fourth pivot axis PA4 can be offset from the third pivot axis PA3.

The bicycle operating device 10 further comprises a return spring 59. The return spring 59 is provided in the hydraulic chamber C1 to bias the piston 26 toward the rest position P21.

The second pivot axis PA2 is disposed between the first and third pivot axes PA1 and PA3 in a perpendicular direction D2 which is perpendicular to the movement direction D1. The third pivot axis PA3 is disposed between the second pivot axis PA2 and the hydraulic chamber C1 in the movement direction D1, at least in an initial state where the piston 26 is positioned at the initial position P21. In other words, the second pivot axis PA2 is farther from the hydraulic chamber C1 than the third pivot axis PA3 in the movement direction D1, at least in the initial state.

The second pivot axis PA2 is disposed at a position which is equal to a position of the first pivot axis PA1 in the movement direction D1 or which is located between the third pivot axis PA3 and the first pivot axis PA1 in the movement direction D1, at least in the initial state. In this embodiment, the second pivot axis PA2 is disposed at a position closer to the third pivot axis PA3 than the first pivot axis PA1 in the movement direction D1 in the initial state where the piston 26 is positioned at the initial position P21. However, the second pivot axis PA2 can be disposed at the position equal to the position of the first pivot axis PA1 in the movement direction D1 in the initial state where the piston 26 is positioned at the initial position P21.

Figure 4:
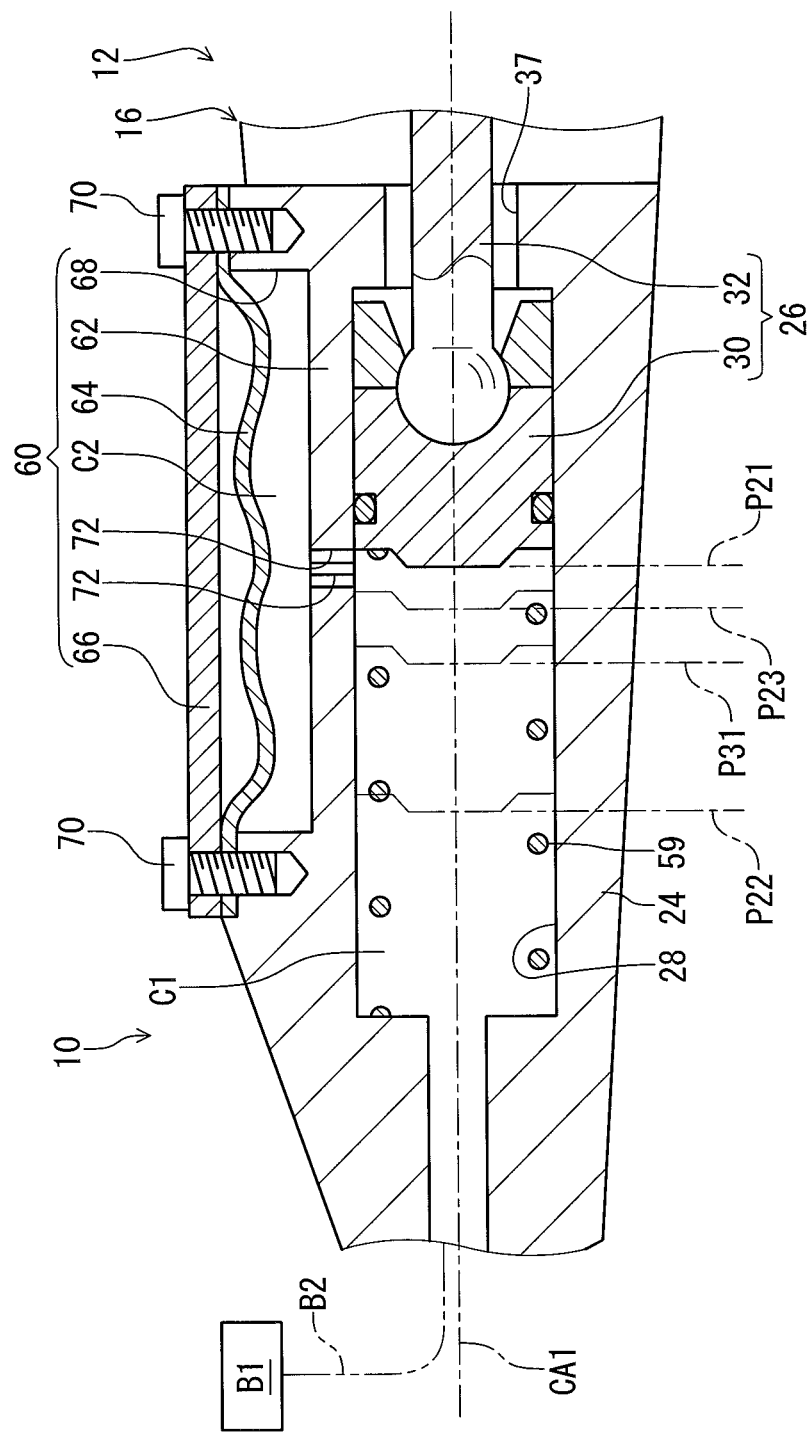
FIG. 4 is a cross-sectional view of the bicycle operating device taken along line IV-IV of FIG. 3 (the initial position).

As seen in FIG. 4, the bicycle operating device 10 further comprises a hydraulic reservoir 60. The hydraulic reservoir 60 is connected to the hydraulic chamber C1 defined by the piston 26 and the hydraulic cylinder 24 in the cylinder bore 28. In this embodiment, the hydraulic reservoir 60 is provided at the base 12 (e.g., the base body 16). The hydraulic reservoir 60 includes a reservoir tank 62, a flexible diaphragm 64, and a cover 66. The reservoir tank 62 is adjacent to the hydraulic cylinder 24. The reservoir tank 62 includes a recess 68. The flexible diaphragm 64 is provided in the recess 68 and is made of a flexible material such as rubber. The cover 66 is attached to the reservoir tank 62 via fasteners 70. The reservoir tank 62 and the flexible diaphragm 64 define a reservoir chamber C2.

The hydraulic reservoir 60 includes connecting holes 72. The reservoir chamber C2 is connected to the hydraulic chamber C1 via the connecting holes 72 in the initial state where the piston 26 is positioned at the initial position P21. The piston 26 covers the connecting holes 72 to interrupt connection between the reservoir chamber C2 and the hydraulic chamber C1 in an intermediate state where the piston 26 is positioned between an intermediate position P23 and the actuated position P22. The intermediate position P23 is defined between the initial position P21 and the actuated position P22 and is closer to the initial position P21 than to the actuated position P22. While the hydraulic reservoir 60 includes the connecting holes 72 in this embodiment, the hydraulic reservoir 60 can include at least one connecting hole 72.

Figure 5:
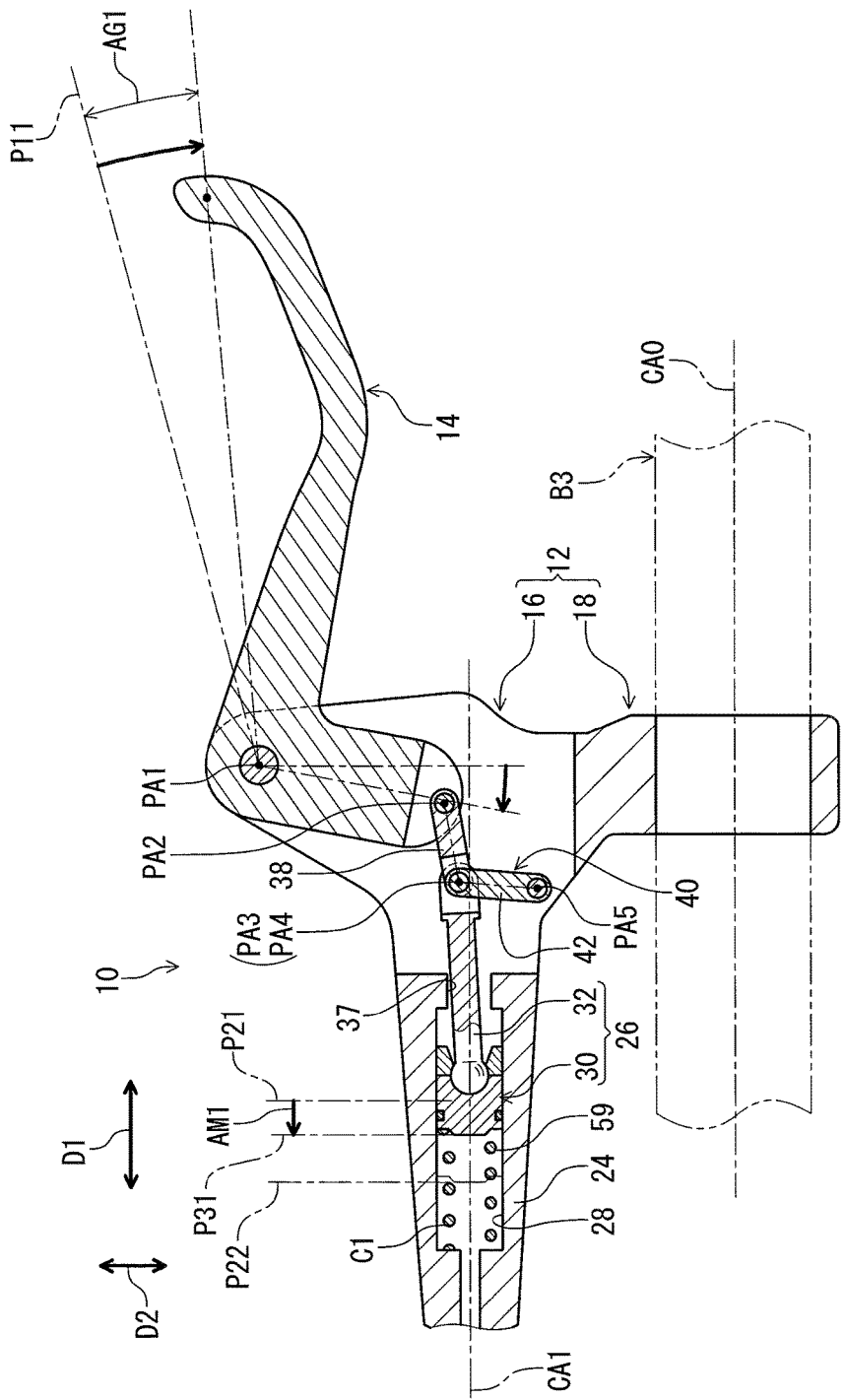
FIG. 5 is a cross-sectional view of the bicycle operating device illustrated in FIG. 1 (a first actuated position).
Figure 6:
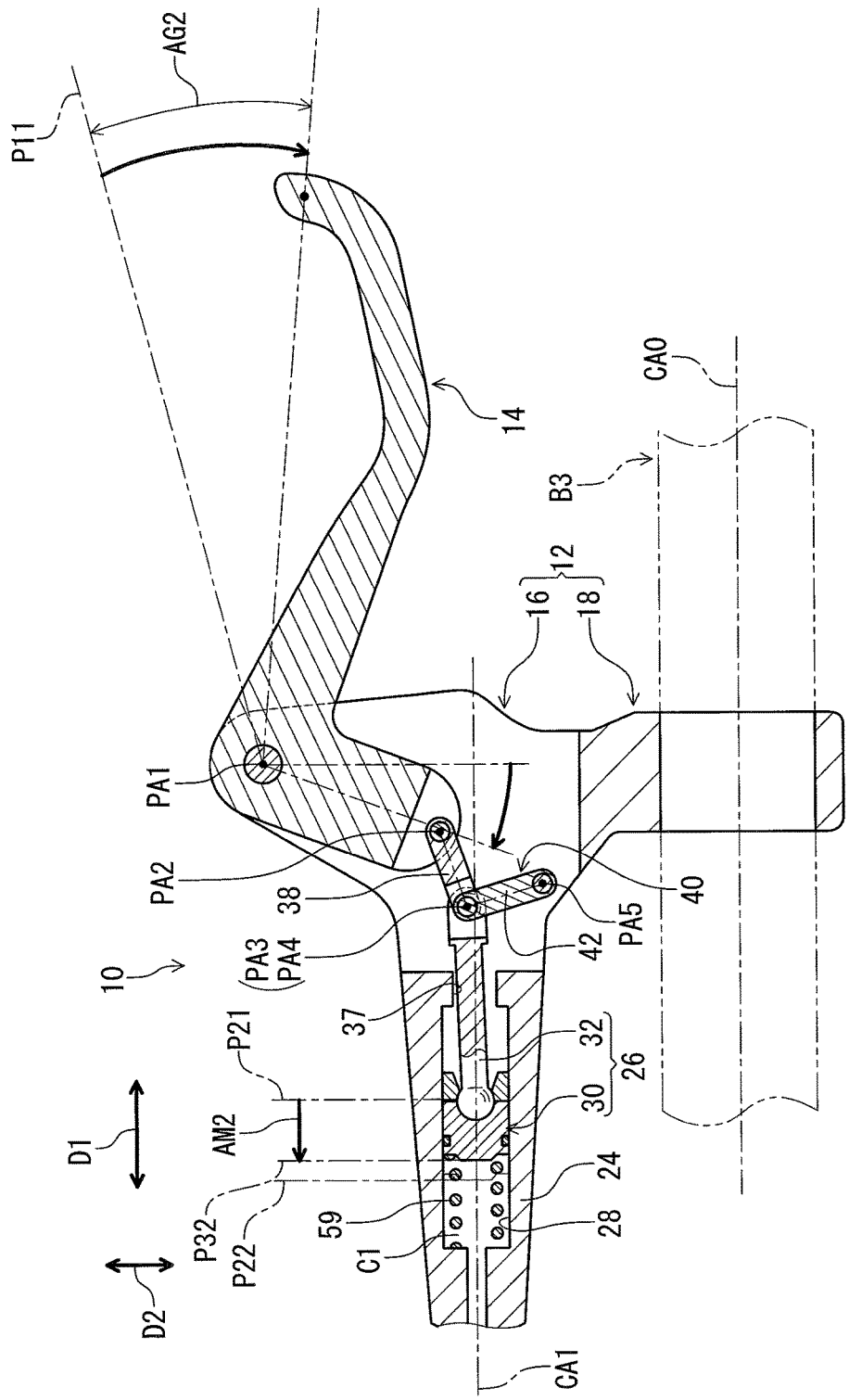
FIG. 6 is a cross-sectional view of the bicycle operating device illustrated in FIG. 1 (a second actuated position).
Figure 7:
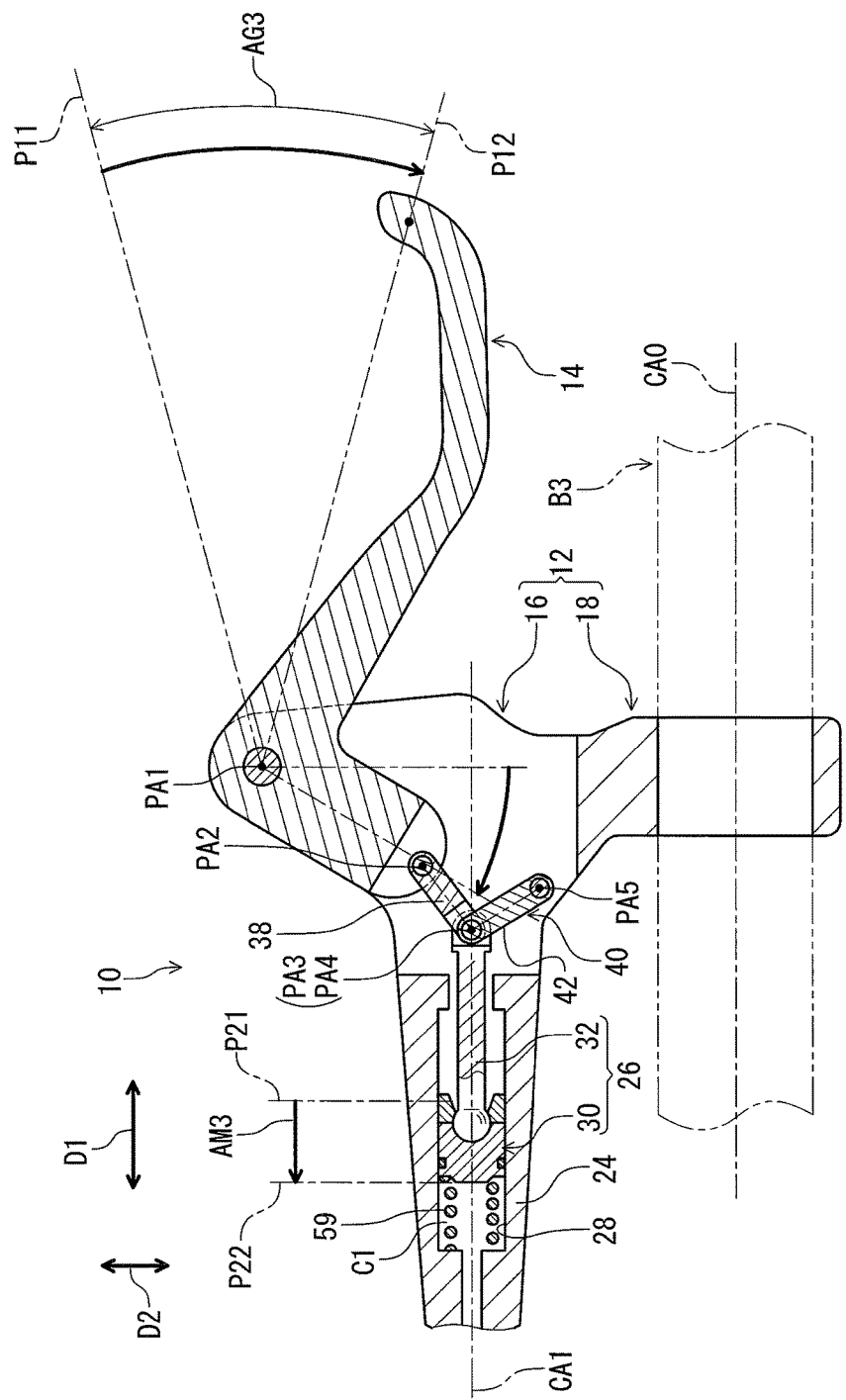
FIG. 7 is a cross-sectional view of the bicycle operating device illustrated in FIG. 1 (a third actuated position).

As seen in FIGS. 5 to 7, when the operating member 14 is pivoted relative to the base 12 from the rest position P11 toward the operated position P12, the pivotal movement of the operating member 14 is transmitted to the piston rod 32 via the connecting link 38. The piston 26 is moved relative to the base 12 from the initial position P21 to the actuated position P22 in response to the pivotal movement of the operating member 14 relative to the base 12 from the rest position P11 to the operated position P12.

As seen in FIG. 5, for example, when the operating member 14 is pivoted relative to the base 12 at a first pivot angle AG1 from the rest position P11, the piston 26 moves from the initial position P21 to a first actuated position P31 by a first amount of movement AM1. In this embodiment, the first pivot angle AG1 is 10 degrees.

As seen in FIG. 6, when the operating member 14 is pivoted relative to the base 12 at a second pivot angle AG2 from the rest position P11, the piston 26 moves from the initial position P21 to a second actuated position P32 by a second amount of movement AM2. In this embodiment, the second pivot angle AG2 is larger than the first pivot angle AG1 and is 20 degrees. The second amount of movement AM2 is longer than the first amount of movement AM1.

As seen in FIG. 7, when the operating member 14 is pivoted relative to the base 12 at a third pivot angle AG3 from the rest position P11, the piston 26 moves from the initial position P21 to the actuated position P22 by a third amount of movement AM3. In this embodiment, the third pivot angle AG3 is larger than the second pivot angle AG2 and is 30 degrees. The third amount of movement AM3 is longer than the second amount of movement AM2.

Figure 8:
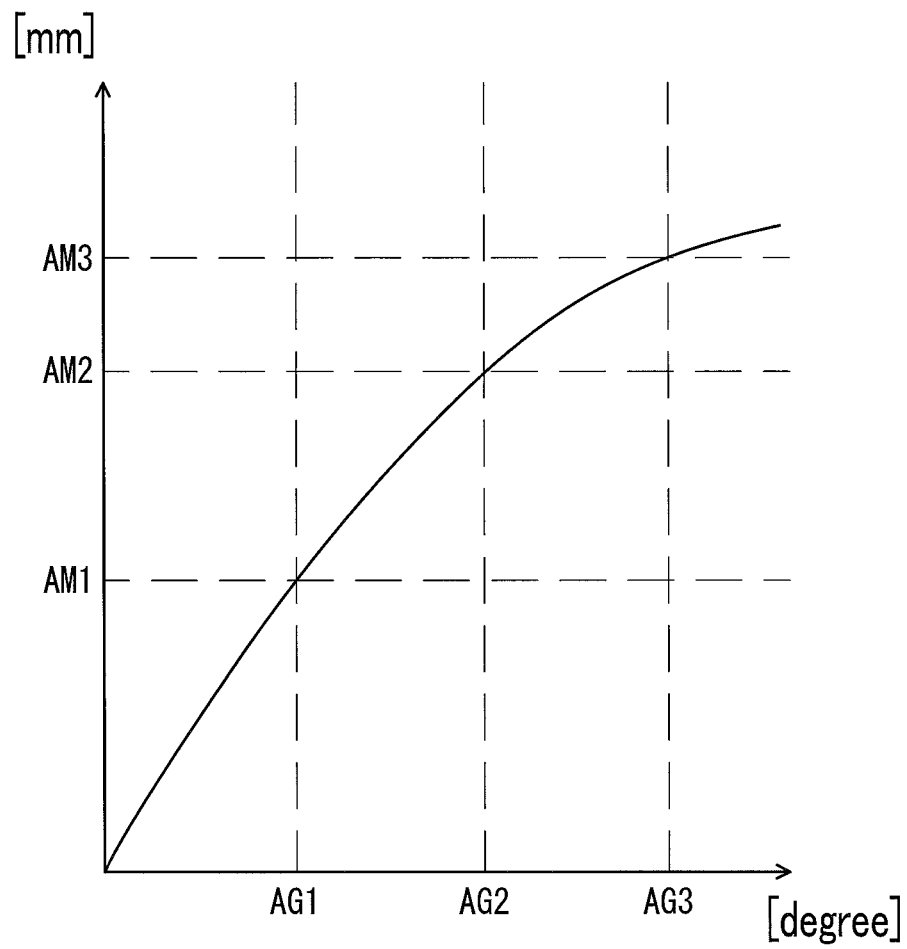
FIG. 8 is a graph showing relationship between an operation angle of an operating member and an amount of movement of a piston in the bicycle operating device illustrated in FIG. 1 (a third actuated position).

As seen in FIG. 8, an amount of movement of the piston 26 rapidly increases from the initial position P21 to the first actuated position P31. An increase rate of the amount of movement of the piston 26 gradually decreases from the first actuated position P31 to the actuated position P22 through the second actuated position P32.

As seen in FIG. 4, the intermediate position P23 is provided between the initial position P21 and the first actuated position P31. Thus, it is possible to shorten a time lag from a timing at which the operating member 14 starts to pivot to a timing at which the piston 26 covers the connecting holes 72. This improves response performance of the bicycle operating device 10.

The bicycle operating device 10 includes the following features.

(1) With the bicycle operating device 10, the connecting link 38 is pivotally coupled to each of the operating member 14 and the piston 26 to move the piston 26 relative to the hydraulic cylinder 24 in response to a pivotal movement of the operating member 14 relative to the base 12. The guiding structure 40 is coupled to the piston 26 to guide the piston 26 relative to the base 12. Accordingly, it is possible to change an amount of movement of the piston 26 relative to an amount of movement of the operating member 14 by changing a shape, a position, and/or a size of the connecting link 38. Thus, it is possible to obtain a preferable movement ratio characteristic between the operating member 14 and the piston 26.

(2) The operating member 14 is pivotally coupled to the base 12 about the first pivot axis PA1. The connecting link 38 is pivotally coupled to the operating member 14 about the second pivot axis PA2 spaced apart from the first pivot axis PA1. The connecting link 38 is pivotally coupled to the piston 26 about a third pivot axis PA3 spaced apart from the first and second pivot axes PA1 and PA2. Accordingly, it is possible to smoothly transmit the pivotal movement of the operating member 14 to the piston 26.

(3) The first, second and third pivot axes PA1, PA2 and PA3 are parallel to each other. Accordingly, it is possible to more smoothly transmit the pivotal movement of the operating member 14 to the piston 26.

(4) The piston 26 is movable relative to the hydraulic cylinder 24 in a movement direction D1 between an initial position P21 and an actuated position P22. The second pivot axis PA2 is disposed between the first and third pivot axes PA1 and PA3 in a perpendicular direction D2 which is perpendicular to the movement direction D1. Accordingly, it is possible to shorten a size of the connecting link 38, allowing the bicycle operating device 10 to be more compact.

(5) The hydraulic cylinder 24 includes a cylinder bore 28 in which the piston 26 is at least partially provided. The piston 26 and the cylinder bore 28 define a hydraulic chamber C1 between the piston 26 and the cylinder bore 28. The second pivot axis PA2 is farther from the hydraulic chamber C1 than the third pivot axis PA3 in the movement direction D1 in the initial state where the piston 26 is positioned at the initial position P21. Accordingly, it is possible to transmit a pushing force from the operating member 14 to the piston 26 via the connecting link 38.

(6) In the initial state where the piston 26 is positioned at the initial position P21, the second pivot axis PA2 is disposed at a position which is equal to a position of the first pivot axis PA1 in the movement direction D1 or which is closer to the third pivot axis PA3 than the first pivot axis PA1 in the movement direction D1. Accordingly, it is possible to quickly change the hydraulic pressure around a starting point of the second pivot axis PA2 corresponding to the initial position P21 of the piston 26.

(7) The guiding structure 40 includes the guiding link 42. The guiding link 42 is pivotally coupled to the piston 26 about the fourth pivot axis PA4. The guiding link 42 is pivotally coupled to the base 12 about the fifth pivot axis PA5. Accordingly, it is possible to make a movement of the piston 26 relative to the base 12 more stable because of the guiding link 42.

(8) The fourth pivot axis PA4 coincides with the third pivot axis PA3.

Accordingly, it is possible to simplify a connecting part provided among the piston 26, the connecting link 38, and the guiding link 42.

(9) The connecting link 38 includes the first proximal end 52 and the first distal end 54. The first proximal end 52 is pivotally coupled to the operating member 14 about the second pivot axis PA2. The first distal end 54 is pivotally coupled to the piston 26 about the third pivot axis PA3. Accordingly, it is possible to simplify the structure of the connecting link 38.

(10) The hydraulic cylinder 24 includes the cylinder bore 28. The piston 26 includes the piston body 30 and the piston rod 32. The piston body 30 is movably provided in the cylinder bore 28. The piston rod 32 is pivotally coupled to the piston body 30 to operatively couple the connecting link 38 to the piston body 30. Accordingly, it is possible to simplify the structure of the piston body 30.

(11) The operating member 14 is pivotally coupled to the base 12 about the first pivot axis PA1. The connecting link 38 is pivotally coupled to the operating member 14 about the second pivot axis PA2 spaced apart from the first pivot axis PA1. The connecting link 38 is pivotally coupled to the piston rod 32 about the third pivot axis PA3 spaced apart from the first and second pivot axes PA1 and PA2. Accordingly, it is possible to smoothly transmit the pivotal movement of the operating member 14 to the piston 26 with simplifying the structure of the connecting link 38.

(12) The guiding link 42 is pivotally coupled to the piston rod 32 about the fourth pivot axis PA4. The guiding link 42 is pivotally coupled to the base 12 about the fifth pivot axis PA5. Accordingly, it is possible to make a movement of the piston 26 relative to the base 12 more stable because of the guiding link 42.

(13) The fourth pivot axis PA4 coincides with the third pivot axis PA3. Accordingly, it is possible to simplify a connecting part provided among the piston rod 32, the connecting link 38, and the guiding link 42.

(14) The bicycle operating device 10 further comprises the hydraulic reservoir 60. The hydraulic reservoir 60 is connected to the hydraulic chamber C1 defined by the piston 26 and the hydraulic cylinder 24 in the cylinder bore 28. The hydraulic reservoir 60 can absorb change in volume of hydraulic fluid caused by change in a temperature of the hydraulic fluid.

Second Embodiment

A bicycle operating device 210 in accordance with a second embodiment will be described below referring to FIG. 9. The bicycle operating device 210 has the same structure as that of the bicycle operating device 10 except for a connecting link 238 and a guiding structure 240. Thus, elements having substantially the same function as those in the first embodiment will be numbered the same here, and will not be described and/or illustrated again in detail here for the sake of brevity.

Figure 9:
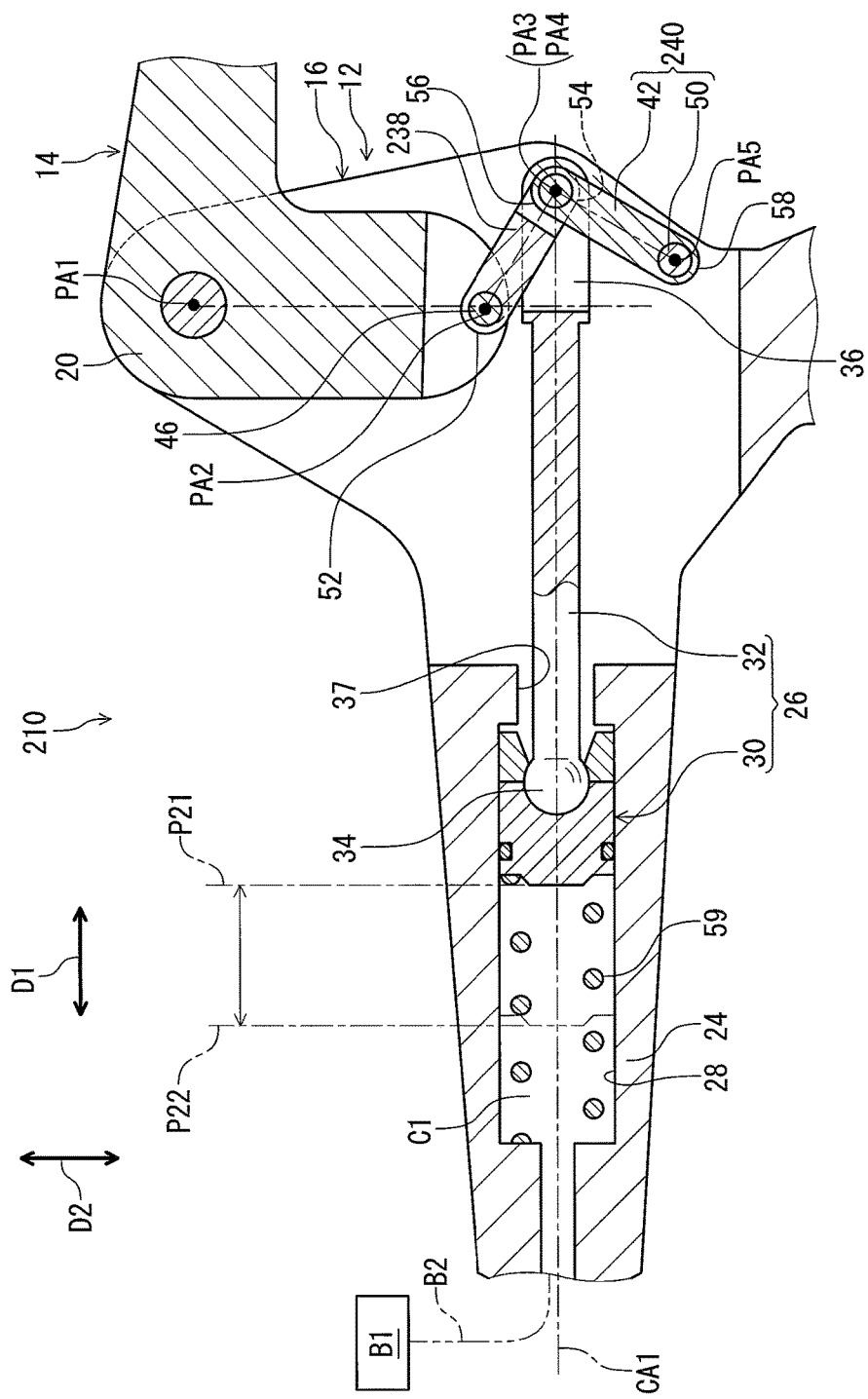
FIG. 9 is a partial enlarged cross-sectional view of a bicycle operating device in accordance with a second embodiment (the initial position).

As seen in FIG. 9, in the bicycle operating device 210, the connecting link 238 and the guiding structure 240 are differently arranged in comparison with the connecting link 38 and the guiding structure 40 of the bicycle operating device 10. The second pivot axis PA2 is disposed between the third pivot axis PA3 and the hydraulic chamber C1 in the movement direction D1, at least in the initial state where the piston 26 is positioned at the initial position P21. In other words, the second pivot axis PA2 is closer to the hydraulic chamber C1 than the third pivot axis PA3 in the movement direction D1, at least in the initial state. The second pivot axis PA2 is disposed at a position which is equal to a position of the first pivot axis PA1 in the movement direction D1 or which is located between the third pivot axis PA3 and the first pivot axis PA1 in the movement direction D1 in the initial state. In this embodiment, the second pivot axis PA2 is disposed at a position closer to the third pivot axis PA3 than the first pivot axis PA1 in the movement direction D1 in the initial state where the piston 26 is positioned at the initial position P21.

With the bicycle operating device 210, it is possible to obtain substantially the same effects of those of the bicycle operating device 10 of the first embodiment.

Furthermore, the bicycle operating device 210 includes the following features.

(1) With the bicycle operating device 210, the second pivot axis PA2 is closer to the hydraulic chamber C1 than the third pivot axis PA3 in the movement direction D1 in the initial state where the piston 26 is positioned at the initial position P21. Accordingly, it is possible to transmit a pulling force from the operating member 14 to the piston 26 via the connecting link 238.

(2) The second pivot axis PA2 is disposed at a position equal to a position of the first pivot axis PA1 or closer to the third pivot axis PA3 than the first pivot axis PA1 in the movement direction D1 in the initial state where the piston 26 is positioned at the initial position P21. Accordingly, it is possible to quickly change the hydraulic pressure around a starting point of the second pivot axis PA2 corresponding to the initial position P21 of the piston 26.

Third Embodiment

A bicycle operating device 310 in accordance with a third embodiment will be described below referring to FIG. 10. The bicycle operating device 310 has the same structure as that of the bicycle operating device 10 except for the guiding structure 340. Thus, elements having substantially the same function as those in the first embodiment will be numbered the same here, and will not be described and/or illustrated again in detail here for the sake of brevity.

Figure 10:
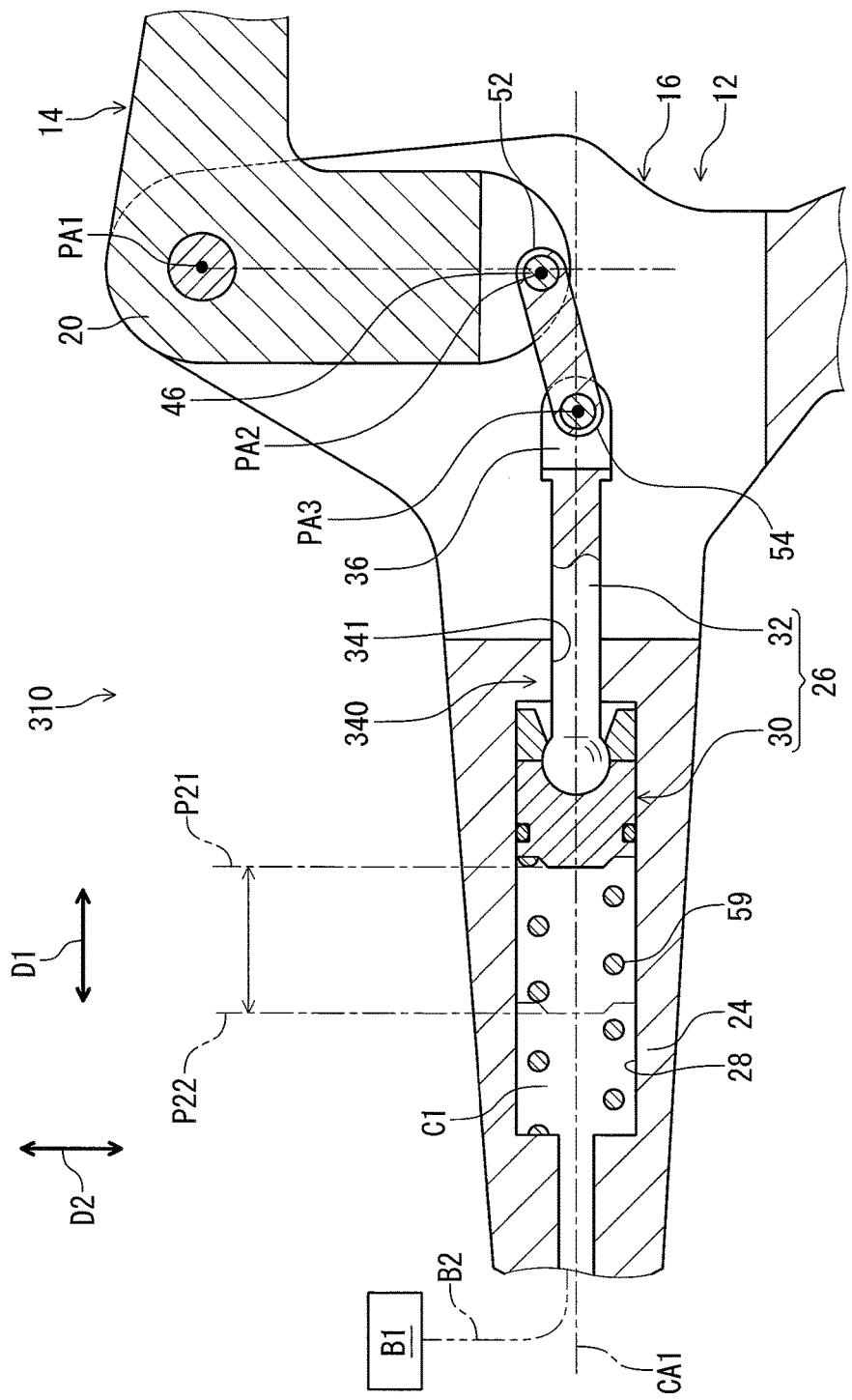
FIG. 10 is a partial enlarged cross-sectional view of a bicycle operating device in accordance with a third embodiment (the initial position).

As seen in FIG. 10, the bicycle operating device 310 comprises a guiding structure 340 coupled to the piston 26 to guide the piston 26 relative to the base 12. Unlike the guiding structure 40 of the first embodiment, the guiding link 42 is omitted from the guiding structure 340 in this embodiment. Instead, the guiding structure 340 includes a guiding bore 341 through which the piston 26 extends. The piston 26 and the cylinder bore 28 define a hydraulic chamber C1 between the piston 26 and the cylinder bore 28. The guiding bore 341 is provided on the base 12 between the hydraulic chamber C1 and the third pivot axis PA3.

The guiding bore 341 is provided at the hydraulic cylinder 24 instead of the through-hole 37. Unlike the through-hole 37 of the first embodiment, however, an inner peripheral surface of the guiding bore 341 is in slidable contact with the piston rod 32. The guiding bore 341 has an inner diameter which is substantially equal to the outer diameter of the piston rod 32 of the piston 26. The inner peripheral surface of the guiding bore 341 guides the piston rod 32 to move in the movement direction D1.

With the bicycle operating device 310, it is possible to obtain substantially the same effects of those of the bicycle operating device 10 of the first embodiment.

Furthermore, the guiding bore 341 is provided on the base 12 between the hydraulic chamber C1 and a third pivot axis PA3. Accordingly, it is possible to make a movement of the piston 26 relative to the base 12 more stable because of the guiding bore 341.

It will be apparent to those skilled in the bicycle field from the present disclosure that the above embodiments can be at least partially combined with each other. For example, the arrangement of the connecting link 238 of the second embodiment can be applied to the bicycle operating device 310 of the third embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base;
   an operating member pivotally coupled directly to the base;
   a hydraulic cylinder mounted to the base;
   a piston movably provided in the hydraulic cylinder;
   a connecting link pivotally coupled to each of the operating member and the piston to move the piston relative to the hydraulic cylinder in response to a pivotal movement of the operating member relative to the base; and
   a guiding structure coupled to the piston to guide the piston relative to the base, wherein
   the hydraulic cylinder includes a cylinder bore, and
   the piston includes
      a piston body movably provided in the cylinder bore, and
      a piston rod pivotally coupled to the piston body to operatively couple the connecting link to the piston body.

2. The bicycle operating device according to claim 1, wherein
   the operating member is pivotally coupled to the base about a first pivot axis,
   the connecting link is pivotally coupled to the operating member about a second pivot axis spaced apart from the first pivot axis, and
   the connecting link is pivotally coupled to the piston about a third pivot axis spaced apart from the first and second pivot axes.

3. The bicycle operating device according to claim 2, wherein
   the first, second and third pivot axes are parallel to each other.

4. A bicycle operating device comprising:
   a base;
   an operating member pivotally coupled to the base;
   a hydraulic cylinder mounted to the base;
   a piston movably provided in the hydraulic cylinder;
   a connecting link pivotally coupled to each of the operating member and the piston to move the piston relative to the hydraulic cylinder in response to a pivotal movement of the operating member relative to the base; and
   a guiding structure coupled to the piston to guide the piston relative to the base, wherein
   the operating member is pivotally coupled to the base about a first pivot axis,
   the connecting link is pivotally coupled to the operating member about a second pivot axis spaced apart from the first pivot axis,
   the connecting link is pivotally coupled to the piston about a third pivot axis spaced apart from the first and second pivot axes, the piston is movable relative to the hydraulic cylinder in a movement direction between an initial position and an actuated position, and the second pivot axis is disposed between the first and third pivot axes in a perpendicular direction which is perpendicular to the movement direction.

5. The bicycle operating device according to claim 4, wherein the hydraulic cylinder includes a cylinder bore in which the piston is at least partially provided, the piston and the cylinder bore define a hydraulic chamber between the piston and the cylinder bore, and the third pivot axis is disposed between the second pivot axis and the hydraulic chamber in the movement direction, at least in an initial state where the piston is positioned at the initial position.

6. The bicycle operating device according to claim 5, wherein the second pivot axis is disposed at a position which is equal to a position of the first pivot axis in the movement direction or which is located between the third pivot axis and the first pivot axis in the movement direction, at least in the initial state.

7. The bicycle operating device according to claim 4, wherein the hydraulic cylinder includes a cylinder bore in which the piston is at least partially provided, the piston and the cylinder bore define a hydraulic chamber between the piston and the cylinder bore, and the second pivot axis is disposed between the third pivot axis and the hydraulic chamber in the movement direction, at least in an initial state where the piston is positioned at the initial position.

8. The bicycle operating device according to claim 7, wherein the second pivot axis is disposed at a position which is equal to a position of the first pivot axis in the movement direction or which is located between the third pivot axis and the first pivot axis in the movement direction, at least in the initial state.

9. The bicycle operating device according to claim 2, wherein the guiding structure includes a guiding link, the guiding link is pivotally coupled to the piston about a fourth pivot axis, and the guiding link is pivotally coupled to the base about a fifth pivot axis.

10. The bicycle operating device according to claim 9, wherein the fourth pivot axis coincides with the third pivot axis.

11. The bicycle operating device according to claim 2, wherein the connecting link includes a first proximal end and a first distal end, the first proximal end is pivotally coupled to the operating member about the second pivot axis, and the first distal end is pivotally coupled to the piston about the third pivot axis.

12. The bicycle operating device according to claim 11, wherein the guiding structure includes a guiding link having a second proximal end and a second distal end, the second proximal end is pivotally coupled to the piston about a fourth pivot axis, and the second distal end is pivotally coupled to the base about a fifth pivot axis.

13. The bicycle operating device according to claim 1, wherein the operating member is pivotally coupled to the base about a first pivot axis, the connecting link is pivotally coupled to the operating member about a second pivot axis spaced apart from the first pivot axis, and the connecting link is pivotally coupled to the piston rod about a third pivot axis spaced apart from the first and second pivot axes.

14. The bicycle operating device according to claim 13, wherein the guiding structure includes a guiding link, the guiding link is pivotally coupled to the piston rod about a fourth pivot axis, and the guiding link is pivotally coupled to the base about a fifth pivot axis.

15. The bicycle operating device according to claim 14, wherein the fourth pivot axis coincides with the third pivot axis.

16. The bicycle operating device according to claim 2, wherein the guiding structure includes a guiding bore through which the piston extends, the piston and the cylinder bore define a hydraulic chamber between the piston and the cylinder bore, and the guiding bore is provided on the base between the hydraulic chamber and the third pivot axis.

17. The bicycle operating device according to claim 1, further comprising:

a hydraulic reservoir, wherein the hydraulic reservoir is connected to a hydraulic chamber defined by the piston and the hydraulic cylinder in the cylinder bore.

18. The bicycle operating device according to claim 1, wherein the operating member is pivotally coupled to the base about a first pivot axis, and the guiding structure is pivotally coupled to the base about a second pivot axis spaced apart from the first pivot axis.

19. A bicycle operating device comprising:

a base;

an operating member pivotally coupled to the base;

a hydraulic cylinder mounted to the base;

a piston movably provided in the hydraulic cylinder;

a connecting link pivotally coupled to each of the operating member and the piston to move the piston relative to the hydraulic cylinder in response to a pivotal movement of the operating member relative to the base; and a guiding structure pivotally coupled to each of the base and the piston to guide the piston relative to the base.

20. The bicycle operating device according to claim 19, wherein the guiding structure includes a guiding link, the guiding link is pivotally coupled to the piston about a first pivot axis, and the guiding link is pivotally coupled to the base about a second pivot axis.

21. The bicycle operating device according to claim 19, wherein the operating member is pivotally coupled to the base about a first pivot axis, and the guiding structure is pivotally coupled to the base about a second pivot axis spaced apart from the first pivot axis.

\* \* \* \* \*